United States Patent [19]

Hämmerling et al.

[11] 4,443,786
[45] Apr. 17, 1984

[54] DATA TRANSMISSION SYSTEM EMPLOYING WIRE AND WIRELESS TRANSMISSION PATHS

[75] Inventors: Heinz Hämmerling, Königstein; Werner Schairer, Weinsberg, both of Fed. Rep. of Germany

[73] Assignee: Licentia Patent-Verwaltungs-GmbH, Frankfurt am Main, Fed. Rep. of Germany

[21] Appl. No.: 304,335

[22] Filed: Sep. 21, 1981

[30] Foreign Application Priority Data

Sep. 24, 1980 [DE] Fed. Rep. of Germany ....... 3035965

[51] Int. Cl.$^3$ .............................................. H04B 3/54
[52] U.S. Cl. ......................... 340/310 R; 340/310 CP; 340/870.29
[58] Field of Search ........ 340/310 R, 310 CP, 870.29, 340/870.28, 538, 310 A, 870.02, 825.72; 455/602, 606, 614

[56] References Cited

U.S. PATENT DOCUMENTS

| | | |
|---|---|---|
| 3,942,170 | 3/1976 | Whyte .............................. 340/310 A |
| 4,119,948 | 10/1978 | Ward et al. ..................... 340/870.28 |
| 4,131,882 | 12/1978 | Hollabaugh et al. ............ 340/310 A |
| 4,173,754 | 11/1979 | Felker ............................... 340/310 A |
| 4,302,750 | 11/1981 | Wadhwani et al. ............. 340/870.02 |
| 4,348,657 | 9/1982 | Merkel .............................. 340/310 R |

*Primary Examiner*—James J. Groody
*Attorney, Agent, or Firm*—Spencer & Frank

[57] ABSTRACT

A data transmission system using an alternating mains supply for a signal transmission path including a movable module having a data input device, a first transmitter coupled to the data input device for transmitting a first wireless transmission of data fed into the input device, a first receiver for receiving a second wireless transmission of data and an output device coupled to the first receiver for putting out data corresponding to the received second wireless transmission. The system additionally includes a fixed module arranged to be connected to the mains supply and including a second receiver for receiving the first wireless transmissions, a line driver coupled to the second receiver for feeding signals into the mains supply corresponding to the data received by the second receiver, a signal receiver for receiving signals from the mains supply and a second transmitter coupled to the signal receiver for transmitting the second wireless transmission of data corresponding to the data received by the signal receiver.

14 Claims, 2 Drawing Figures

DATA TRANSMISSION SYSTEM EMPLOYING WIRE AND WIRELESS TRANSMISSION PATHS

BACKGROUND OF THE INVENTION

The invention relates to a data transmission system using 50 Hz or 60 Hz domestic alternating mains supply as a transmission path.

It has already been suggested that existing electrical installations in residential premises should be used as transmission paths for control commands (Markt und Technik, issue No. 22, May 30, 1980, page 85). In the proposed transmission system a control station is connected to the lighting mains. With the aid of the input keyboard arranged in the control station switching and control commands are passed on via the control station to devices which are connected via a decoder device to the alternating mains supply. Furthermore, it has also already been suggested that the existing electrical installations of residential premises should be used as a transmission path for intercommunication systems. The signal is frequency modulated, passed to the 50 Hz lighting mains and reproduced at the receiving location, after demodulation, through a loudspeaker. The combined speech and receiving location of these intercommunication systems is then connected to a socket of the lighting mains. These devices are permitted by the telecommunications authorities in some countries.

The proposed transmission system has the disadvantage that a fixed electrical connection always has to be present in the system if domestic appliances are to be controlled or monitored, if data is to be fed in or scanned, or if speech is to be transmitted.

SUMMARY OF THE INVENTION

It is an object of the invention to overcome the above disadvantage.

According to a first aspect of the invention, there is provided a data transmission system for use on domestic mains supply comprising a fixed module for input and output of data into and from the mains supply and a movable module for transmitting signals to and receiving signals from said fixed module.

According to a second aspect of the invention, there is provided a data processing system using 50 Hz or 60 Hz domestic alternating mains supply as its transmission path, wherein a fixed module is provided at certain locations at which signals are to be fed in or removed from the mains supply; and a second movable module is provided which receives the signals in a suitable form from the first module or transmits them thereto.

BRIEF DESCRIPTION OF THE DRAWINGS

The invention will now be described in greater detail, by way of example, with reference to the drawings, in which.

DESCRIPTION OF THE PREFERRED EMBODIMENT

Basically in data transmission system of the type described at the outset, the invention provides a fixed module at certain locations at which signals are to be fed in or taken out of the mains and provides a second movable module which receives the signals in a suitable form from the first module or transmits them thereto.

The wireless data transfer between the modules takes place preferably with the aid of infra-red rays so that both modules—the fixed module and the movable module—need an infra-red radiation—emitting component and a component which is sensitive to infra-red rays. Besides the receiving and transmitting components, which are preferably IR diodes or pin diodes, the modules also contain amplifiers, code-converters or modulators and demodulators and driver stage keyboards for example, or in the case of voice intercommunication systems, microphones may serve as the signal input—especially on the movable module. The signal output is provided accordingly either by means of display units, printers, associated data processing systems or loudspeakers. The data transmission system according to the invention is preferably used as an intercommunication system, as a control system for associated electrical devices or data transmission systems, or as a transmission avenue for values ascertained by sensors transmitting them to evaluation units.

Figure 1:
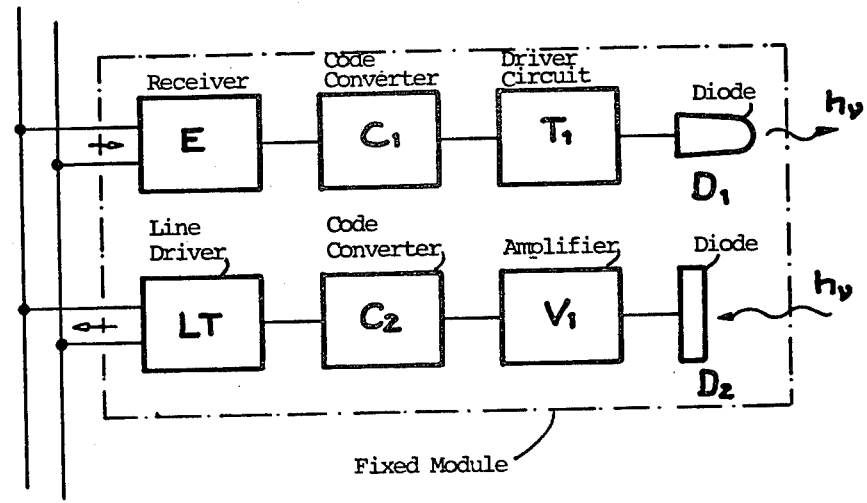
FIG. 1 is a block diagram of a fixed module for the data transmission system in accordance with the invention.

Referring now to the drawings, two basic types of modules are required in order to extend the data transmission through the 50 Hz or 60 Hz domestic alternating mains supply with the aid of an IR radiation path. A fixed module connected mechanically and electrically to the network is shown in FIG. 1. A pulsed infra-red beam for example which contains the information which is to be passed on falls on to a pin diode $D_2$ which is sensitive to infra-red rays. An amplifier $V_1$ is connected to this pin diode $D_2$ and passes the signal to a code converter $C_2$ in amplified form. In the code converter $C_2$ the signal is passed to the alternating mains supply in frequency modulated form for example via an electrical line driver LT. The carrier frequency has to be so selected that the mains operation and the operation of other data transmission systems is not affected thereby.

A signal which is, for example, frequency modulated and which arrives via the line network is picked up by an associated signal receiver E and is converted in a code converter $C_1$ into, a code which is suitable for operation of an infra-red transmission diode $D_1$. Pulse code modulation by way of example is suitable for this. The incoming signal then arrives at a driver circuit $T_1$ for driving an infra-red transmitting diode $D_1$. This infra-red transmitting diode $D_1$ then passes the information in pulsed form, in the example mentioned via the infra-red beam, to the movable module shown in FIG. 2.

Figure 2:
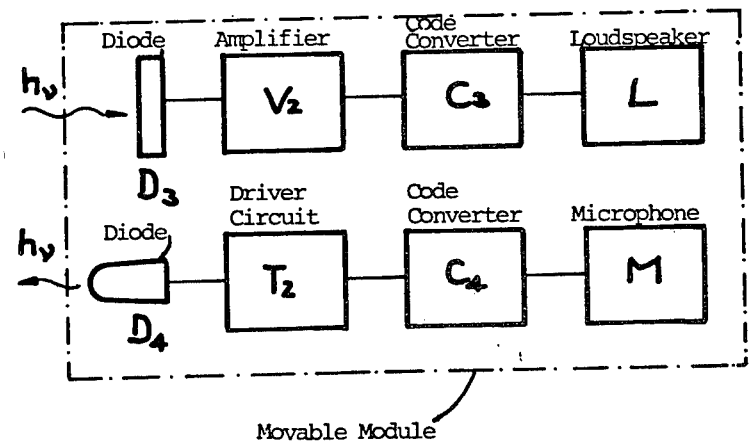
FIG. 2 is a block diagram of a movable module for use with the fixed module of FIG. 1.

The movable module according to FIG. 2 picks up the infra-red signal emitted by the fixed module via a pin diode $D_3$. This signal is passed to a code converter $C_3$ in a form amplified by an amplifier $V_2$, said code converter converting the information incoming in digital form for example, into numeric characters, into printing commands or into control signals for a loudspeaker L.

Accordingly, the signal input is carried for example by means of a keyboard or a microphone M and passes to a coder $C_4$ which converts the signal using pulse code modulation for example and passes it to a driver circuit $T_2$, an infra-red diode $D_4$ being triggered thereby. The infra-red diode $D_4$ emits a pulsed IR beam in the example mentioned, this beam being picked up by the fixed module, shown in FIG. 1, and in the manner which has already been described is processed and passed to the line network. The modules in accordance with FIGS. 1 and 2 can be constructed with conventional integrated components. The modules preferably have a small compact form the fixed module can be provided with a plug connector which fits into the socket of the domestic mains supply while the movable module preferably includes the input and output means such as the keyboard, loudspeaker, microphone, printer etc. This second movable module has approximately the size of a pocket calculator or a dictating machine.

With the aid of the modules described and with the possibility of extending the data transmission without wiring as desired, all household appliances can be controlled much more easily or they can pick up all of the control functions. Furthermore—as already described—an intercommunications system can be constructed or a central control station inside the building can be addressed for the purpose of input of information or scanning data already fed in by means of the sensors, for example.

It will be understood that the above description of the present invention is susceptible to various modifications, changes and adaptations.

What is claimed is:

1. A data transmission system using alternating mains supply as its transmission path, wherein a fixed module is provided at certain locations at which signals are to be fed in or removed from the mains supply; a second movable module is provided which receives the signals in a suitable form from the fixed module or transmits them thereto, and comprising an infra-red radiation emitting component and an infra-red radiation sensitive component for each said module for wireless infra-red data transmission between said modules.

2. A data transmission system as defined in claim 1, wherein said system comprises an intercommunication arrangement for use as a control system for associated electrical devices or data transmission systems or as a transmission avenue for the values of associated sensors.

3. A data transmission system as defined in claim 1, wherein said fixed module includes a line driver coupled to the infra-red radiation sensitive component associated with said fixed module for feeding the signals received by said associated infra-red radiation sensitive component into said mains supply, a receiver for receiving signals from said mains supply, and a driving circuit coupled to said receiver and to the infra-red emitting component associated with said fixed module for driving said associated infra-red emitting component with the signals received by said receiver.

4. A data transmission system as defined in claim 3, wherein said fixed module includes a first code converter and an amplifier serially connected between said line driver and said associated infra-red radiation sensitive component, and a second code converter connected between said receiver and said driving circuit.

5. A data transmission system as defined in claim 1, wherein said movable module includes a signal input device, a driver circuit coupled to said signal input device and to the infra-red emitting component associated with said movable module for driving said associated infra-red emitting component with the signals from said signal input device, and an output device coupled to the infra-red sensitive component associated with said movable module for producing output signals corresponding to the signals received by said associated infra-red sensitive component.

6. A data transmission system as defined in claim 5, wherein said movable module includes a first code converter connected between said signal input device and said associated infra-red emitting component, and an amplifier and second code converter serially connected between said output device and said associated infra-red sensitive component.

7. A data transmission system as defined in claim 5, wherein said input device comprises a microphone.

8. A data transmission system as defined in claim 5, wherein said input device comprises a keyboard.

9. A data transmission system as defined in claim 5, wherein said output device comprises a display unit.

10. A data transmission system as defined in claim 5, wherein said output device comprises a printer.

11. A data transmission system as defined in claim 5, wherein said output device comprises a data processing system.

12. A data transmission system as defined in claim 5, wherein said output device comprises a loudspeaker.

13. A data transmission system for use on domestic mains supply comprising a fixed module for input and output of data into and from the mains supply and a movable module for transmitting signals to and receiving signals from said fixed module, wherein said fixed and movable modules each include an infra-red radiation emitting component and an infra-red radiation sensitive component for wireless infra-red transmission between said modules.

14. A data transmission system using an alternating mains supply for a signal transmission path, said system comprising:

a movable module including a data input device, a first infra-red emitting component coupled to said data input device for transmitting a first wireless transmission of infra-red signals representing data fed into said data input device, a first infra-red sensitive component for receiving a second wireless transmission of infra-red signals representing data and an output device coupled to said first infra-red radiation sensitive component for putting out data corresponding to the received second wireless transmission; and a fixed module arranged to be connected to the mains supply and including a second infra-red sensitive component for receiving the first wireless transmission, means coupled to said second infra-red sensitive component for feeding data into the mains supply corresponding to the data received by said second infra-red sensitive component, signal receiver means for receiving data from the mains supply and a second infra-red emitting component coupled to said signal receiver means for transmitting a second wireless transmission of infra-red signals representing data corresponding to the data received by a said signal receiver means.

* * * * *